United States Patent
Granzotto et al.

(10) Patent No.: US 9,950,673 B2
(45) Date of Patent: Apr. 24, 2018

(54) DRAWER ARRANGEMENTS (71) Applicant: MORryde International, Inc., Elkhart, IN (US)

(72) Inventors: Anthony J. Granzotto, Constatine, MI (US); Adam Timmins, Elkhart, IN (US)

(73) Assignee: MORryde International, Inc., Elkhart, IN (US)

( * ) Notice: Subject to any disclaimer, the term of this patent is extended or adjusted under 35 U.S.C. 154(b) by 0 days.

(21) Appl. No.: 14/757,176

(22) Filed: Nov. 30, 2015

(65) Prior Publication Data
US 2017/0151913 A1 Jun. 1, 2017

(51) Int. Cl.
B60R 7/04 (2006.01)
A47B 88/14 (2006.01)
A47B 88/16 (2006.01)
A47B 88/04 (2006.01)

(52) U.S. Cl.
CPC .......... *B60R 7/043* (2013.01); *A47B 88/0455* (2013.01); *A47B 88/14* (2013.01); *A47B 88/16* (2013.01)

(58) Field of Classification Search
CPC ..... B60R 7/043; A47B 88/0455; A47B 88/14; A47B 88/16
See application file for complete search history.

(56) References Cited

U.S. PATENT DOCUMENTS 7,661,777 B2 * 2/2010 Ceccarelli ............ A47B 46/005
312/323

* cited by examiner

*Primary Examiner* — D Glenn Dayoan
*Assistant Examiner* — Melissa A Black
(74) *Attorney, Agent, or Firm* — Botkin & Hall, LLP

(57) ABSTRACT

Drawer arrangements are provided which include a drawer connected to a support structure having three guides for the path of the drawer between open and closed positions, at least two of which are operational at any given position of the drawer, as it moves both horizontally and vertically between different locations. In a closed position, the drawer is supported near its horizontal extremities and rests in a position that resists horizontal motion. In fully extended open positions, the drawer is supported in a cantilevered manner from the support structure. Intermediate the fully closed and fully extended positions, the drawer is supported in inclined positions which provide access to contents therein. The present invention also includes mounting structure which facilitates connection at a variety of locations under the floor of a motor home, with exterior accessibility.

4 Claims, 8 Drawing Sheets

DRAWER ARRANGEMENTS

BACKGROUND AND SUMMARY OF THE INVENTION

The present arrangement relates generally to drawers, shelves, trays, and the like, for supporting and retaining articles for storage and readily accessible use. More particularly, the present invention relates to drawers for use with enclosures wherein the vertical dimension of the enclosure is greater than the vertical dimension of the access opening to the enclosure, such that there is extra vertical storage space than the opening to itself indicate. Still further, the present invention relates to drawers for use with exteriorly accessible storage spaces in vehicles bodies, such as with motor homes and towed recreational vehicles.

Drawers (meaning generically, drawers, trays, shelves, and other movable surfaces which support and retain articles) are typically movable between open and closed positions. In an open position, drawers typically extend outward from a housing and give access to the articles within the drawer. In a closed position, drawers typically are retained within an enclosure of the housing, where access to the articles is restricted. A support structure for the drawer is mounted between the housing and the drawer to guide the drawer in its motion between open and closed positions. Some drawers include a front face mounted thereto which acts as an exterior face to the housing. Alternatively, some housings include one or more doors, separately mounted from the drawer, to cover an opening that gives access to the enclosure and the drawer(s) mounted therein. With the latter structures, when the door is opened, the drawer is then available to be pulled outward through the enclosure opening. These latter structures are commonly used with vehicles, wherein an exterior sidewall of the vehicle has an access door which can open to a storage enclosure, with drawer(s) or the like therein.

Typically, it is desirable for a drawer to be able to extend out of its enclosure to expose the entire inventory of articles it contains, rendering those articles most easily accessible, when the drawer is fully opened. Alternatively, full exposure of the load surface of the drawer can allow the users to most easily place articles on the drawer for storage. Prior drawers have sought to accomplished this by having, for example, telescopic guide rails or tracks attached to the sides of the drawer and to the support structure inside of the enclosure. As those drawers are pulled open, the individual rails move with respect to one another and telescope outwardly to support the drawer in a cantilevered connection to the housing. However, such telescopic guide rails are relatively expensive and are vulnerable to contact with dirt, debris, snow, and water which can jam and/or rust the mechanism and prevent closure and/or proper operation of the drawer, particularly when the guide rails are used outdoors. In addition, certain telescopic rails of that type can add significantly to the overall width of the drawer. Also, where the drawer must be pulled through the housing opening, any extra width of the drawer due to side-mounted guide rails will decrease the area of the load surface available for the drawer. Further, telescopic guide rails of this type typically permit motion of the drawer only in horizontal directions.

Often storage enclosures, such as those formed in the exterior of a motor home or travel trailer, have greater vertical dimension than the door used to provide access to that enclosure. Therefore, drawers mounted in such housings to move only horizontally either cannot move through the door, if the full vertical height is be utilized by the drawer load surface, or cannot utilize the full vertical height of the enclosure, if the drawer is mounted to move through the door. Further, if the drawer is mounted to move through the door, using guide rails which permit only horizontal motion necessitates the drawer blocking a portion of the door opening. Thus, the size of articles which may be stored in the enclosure is reduced even further than the door dimensions, by the reduced door clearance caused by the drawer.

It has been suggested to create drawers which move vertically within a housing, but these can require the use of more complex spring, pneumatic, or hydraulic systems to assist the vertical motion. Further, prior vertical drawer arrangements may not provide the fullest amount of horizontal extension desired for use with a separate enclosure door. In addition, prior vertical drawer arrangements may not be sufficiently sturdy to support the drawer and its contents reliably during travel of a vehicle. Motor homes, in particular, can be subject to significant road vibration and jostling of cargo, particularly when being driven over unpaved roads and trails.

It has also been suggested to create drawers which can be pivoted at one end to move up and down as an incline to give access to the drawer contents within the enclosure. Again, these may not be able to provide as much convenient access as drawers which can extend substantially outward through the housing door. Further, such drawers may not be as easy to manipulate to the closed or raised position as a horizontally movable door, at least without the extra cost and structure of lift assisting elements. Also, vehicular vibration and jostling during travel may require the addition of substantial locking and/or latching mechanisms to enable these inclined drawers to properly secure their contends during travel.

In general, when storing items in a drawer for vehicular travel, it has been found advantageous to secure the drawer at its horizontal extremities in order to obtain the most support of the load surface. In contrast, securing the drawer in a manner that is more cantilevered with respect to the support structure permits the ends of the drawer to experience greater vibration during travel, especially when heavier articles are placed at the drawer ends. However, with prior arrangements, securing the drawer at its horizontal extremities has been found to limit the extent of travel that a drawer can provide out of the enclosure opening. Thus, while some prior drawers are more secure for travel, they do so at the expense of user ease and accessibility when the vehicle is stopped, and retained articles and cargo are then needed by the user.

Accordingly, it is an object of the present invention to provide improved drawer arrangements, particularly for use with storage enclosures and vehicles. Other objects are the provision of drawer arrangements that are:
  economical to manufacture, install, and maintain in good
    working order,
  reliable over long periods of time and when used in
    exterior environments,
  easy to use in terms of accessibility and operation,
  minimal in weight and complexity in use,
  retrofitable to existing storage enclosures,
  suitable for vehicular use,
  able to securely maintain significant loads therein,
  able to maximize utilization of storage enclosures,
  able to maximize door clearance,
  able to partially or wholly hide stored articles from view
    when the door to the enclosure is open, and
  maximize the size of articles which may be stored in the
    drawer and/or in the storage enclosure area.

These and other objects of the present invention are obtained by the provision of drawer arrangements including a drawer connected to a support structure having three guides for the path of the drawer between open and closed positions, at least two of which are operational at any given position of the drawer, as it moves both horizontally and vertically between different locations. In a closed position, the drawer is supported near its horizontal extremities and rests in a position that resists horizontal motion. In fully extended open positions, the drawer is supported in a cantilevered manner from the support structure. Intermediate the fully closed and fully extended positions, the drawer is supported in inclined positions which provide access to contents therein. The present invention also includes mounting structure which facilitates connection at a variety of locations under the floor of a motor home or travel trailer, with exterior accessibility.

Other objects, advantages and novel features of the present invention will become readily apparent to those skilled in the art from the following drawings and more detailed description of preferred embodiments.

BRIEF DESCRIPTION OF PREFERRED EMBODIMENTS

Figure 1:
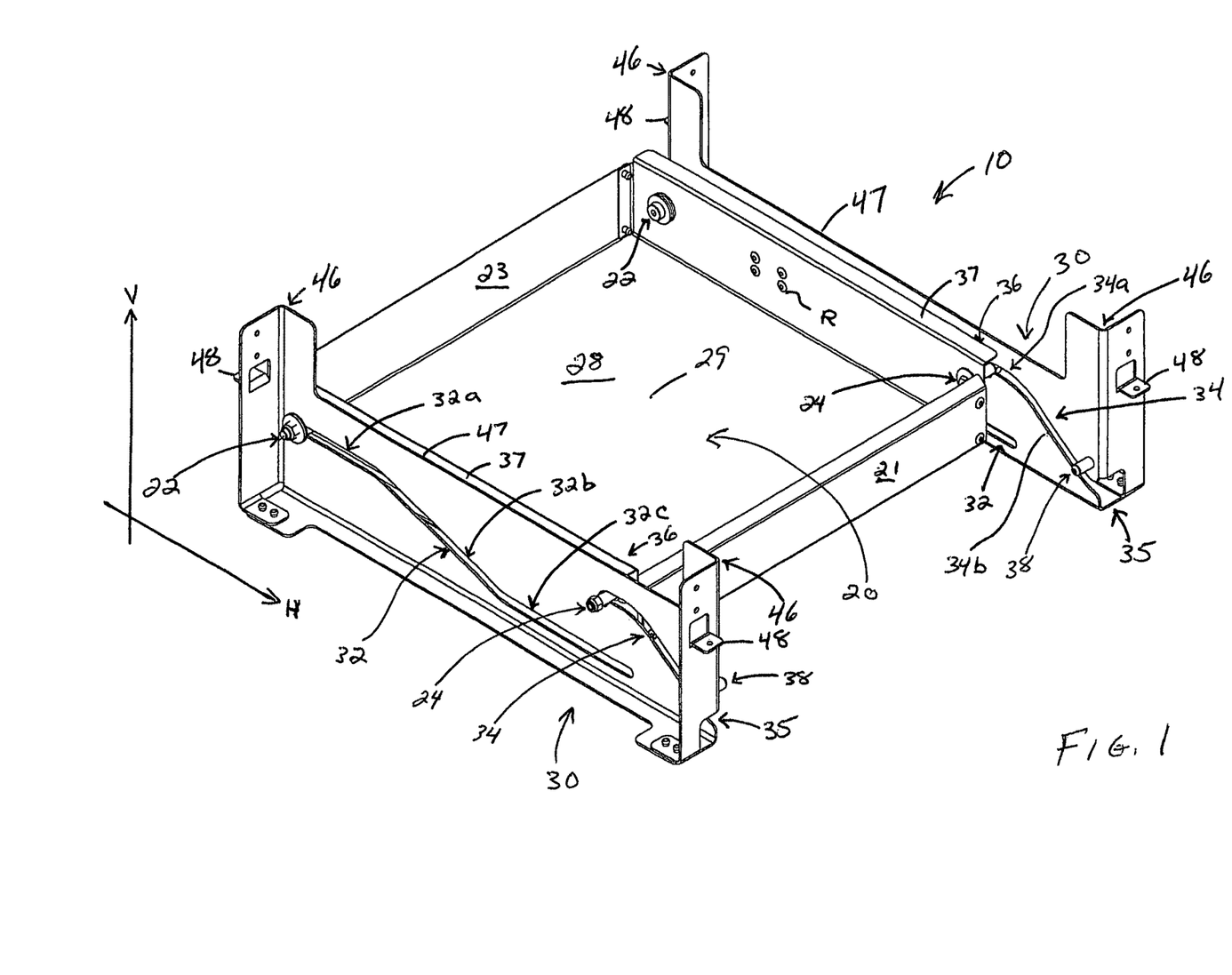
FIG. 1 is a front, left, upper perspective view of a drawer arrangement according to the present invention, in a fully closed position.
Figure 2:
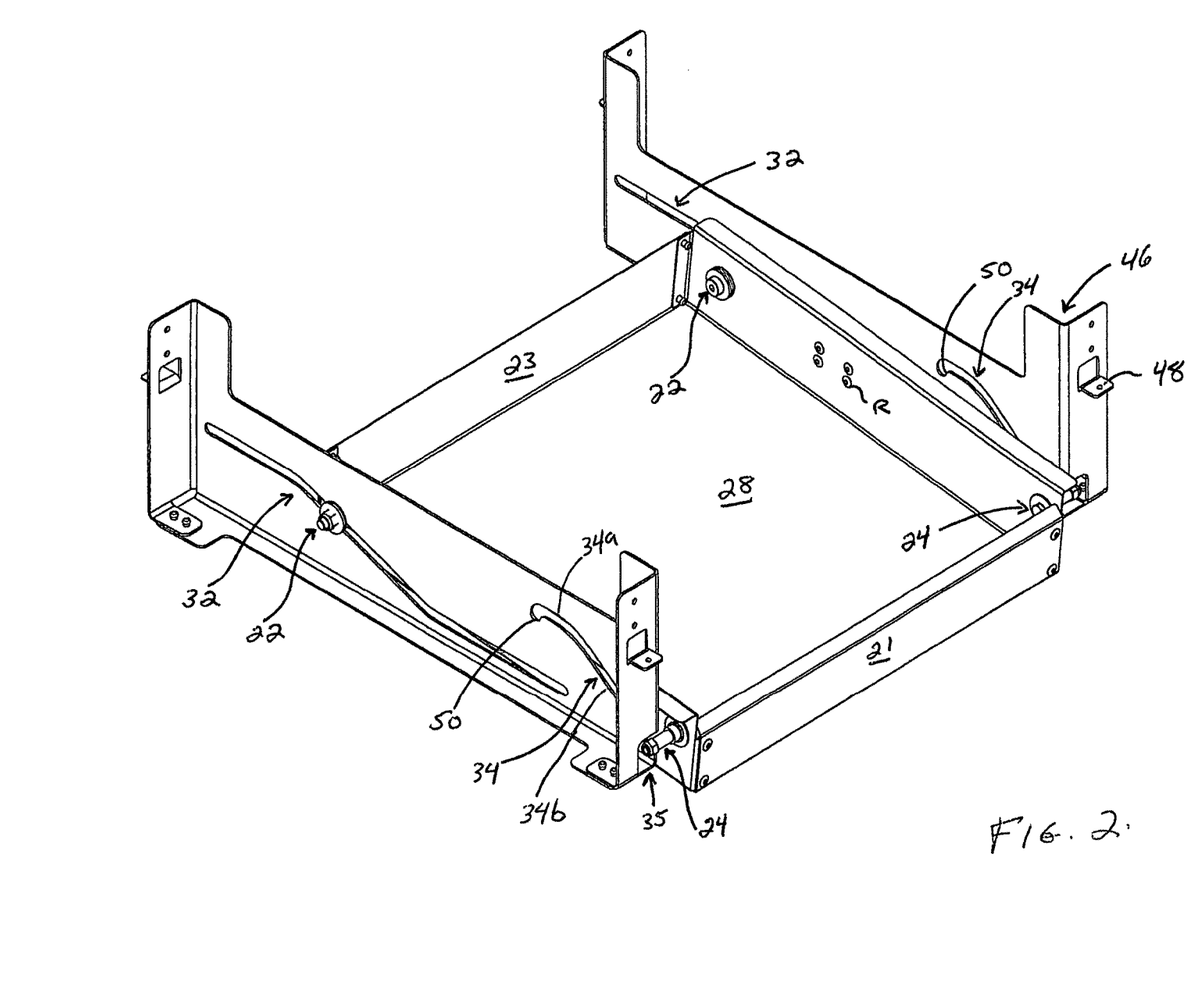
FIG. 2 is a front, left, upper perspective view of the drawer arrangement of FIG. 1, in a partially opened position at an incline.
Figure 3:
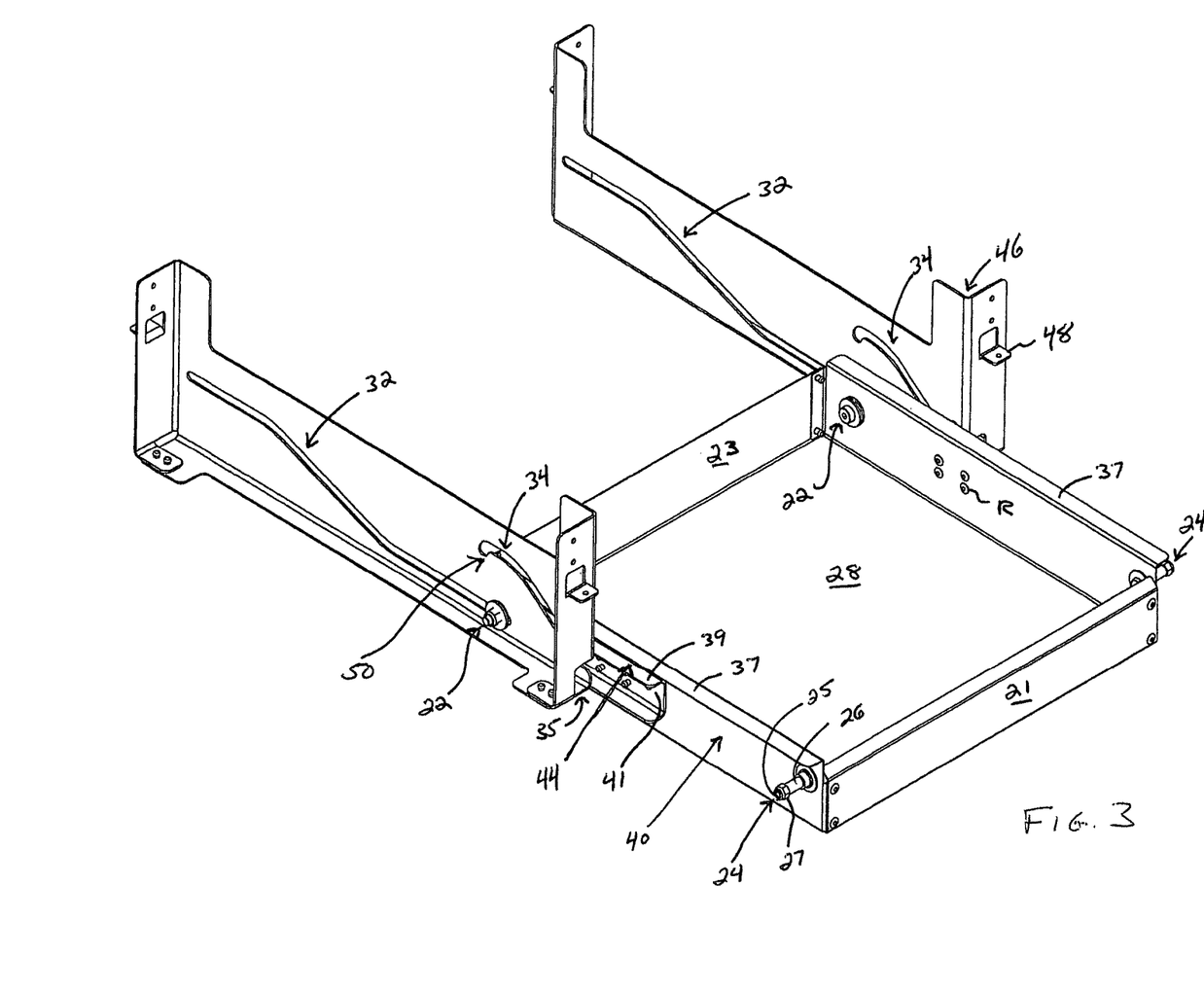
FIG. 3 is a front, left, upper perspective view of the drawer arrangement of FIG. 1, in a fully extended or opened position.
Figure 4:
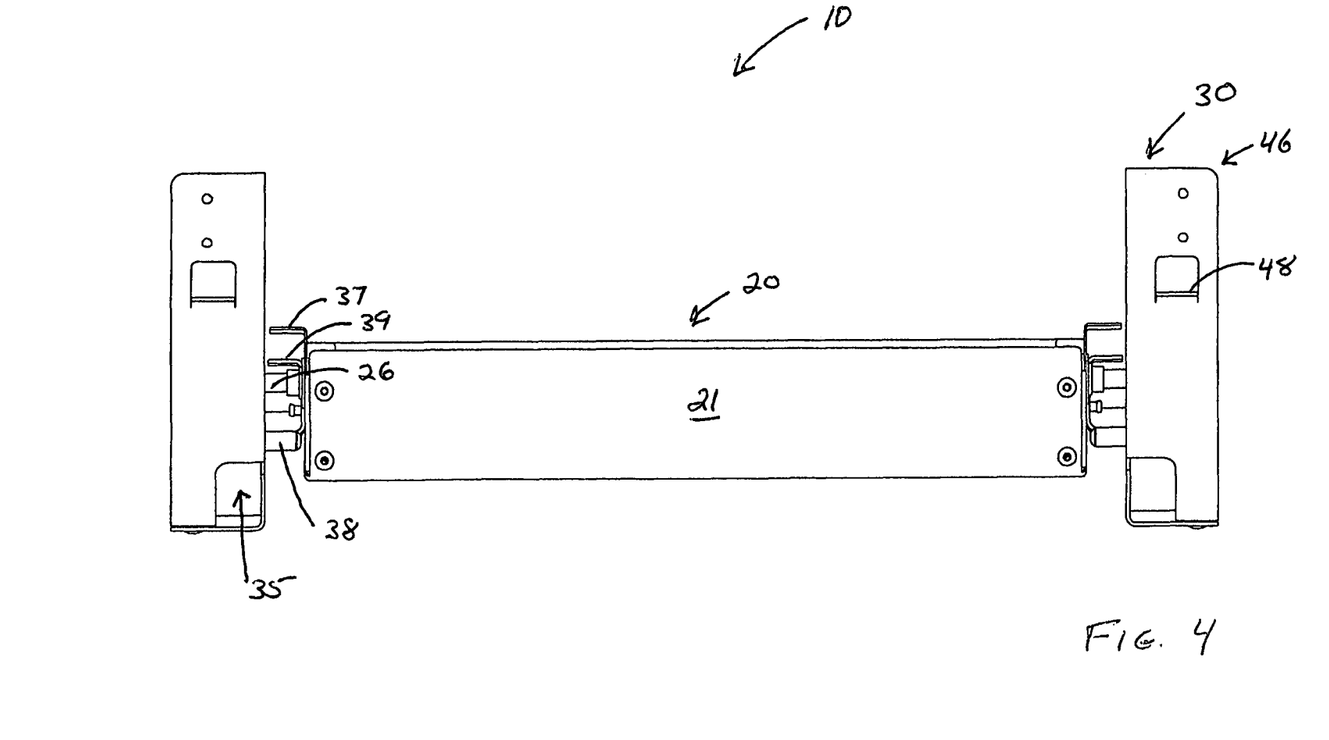
FIG. 4 is a front view of the drawer arrangement of FIG. 1, in a fully closed position.

FIG. 1 illustrates a preferred embodiment of the present invention which is especially suitable for use in a recreational vehicle, such as a motor home or towed travel trailer. However, the specific housing 60 selected for containing the drawer arrangement of the present invention, can, in the alternative, also be a static structure, such as a fixed home, office, or even a piece of furniture. The specific size of the drawer arrangement, including the length of the travel of the drawer in horizontal and vertical directions, can be, as a result of the present invention, a matter of design choice, according to the size and location of the storage enclosure it is employed with.

Figure 14:
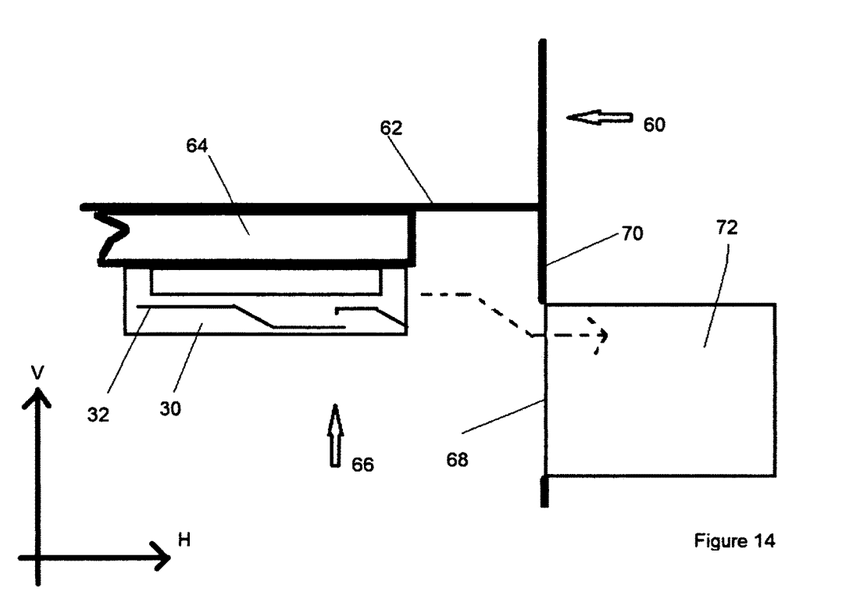
FIG. 14 is a partial cross-sectional side view of a drawer arrangement according to the present invention as mounted in a vehicle with an exterior access door opened to provide access to the storage enclosure.

As shown in FIG. 1, the drawer arrangement 10, includes at least a drawer 20 and a support structure 30 to receive and retain that drawer within the enclosure. FIG. 14 illustrates an exemplary environment of that drawer arrangement. In this case, an exterior storage compartment of a vehicle 60 serves as the housing. Motor homes and travel trailers typically have interior floors 62 supported by multiple beams 64, spaced apart underneath the floor. These beams can be, for example, steel or aluminum tubes or I-beams or C-beams or the like, which run the length of the vehicle and/or laterally across a portion of the vehicle. Such vehicles also typically have storage compartments 66 formed by one or more enclosures underneath the floor. These enclosures typically expose the beams supporting the floor, as those beam extend into and/or through the enclosures. These storage compartments are typically accessible by the users through door openings 68 formed in one or more of the side walls 70 of the vehicle. A door 72, hinged at one side of such a door opening, so as to swing open away from the side wall, is often used to control access through the door opening. The drawer arrangement of the present invention is, for example, mounted to the beam at a location that permits it to move vertically along axis V and horizontally along axis H from the storage compartment out the door opening, along the path of dashed line arrow shown in FIG. 14. In especially preferred embodiments, the drawer arrangement can be mounted between two adjacent beams, such that the vertical space between the beams can be effectively utilized.

More specifically, drawer arrangement 10 includes a drawer 20 formed with a forward or front wall 21, a back or rear wall 23, and a load surface 28 therebetween. The load surface is where articles are placed onto the drawer and stored until needed. The load surface is, for example, provided with a means 29 of retaining articles thereon during movement of the drawer and movement of the vehicle. Several different structures can be used for this purpose, including, but not limited to, a compressive mat or pad with a somewhat adherent surface, removable netting, or an abrasive surface coating or tray paper which resists sliding of articles placed thereon.

Drawer 20 is also provided with a first load bearing member 22 mounted on each side of the drawer, preferably toward the rear of the drawer, and a second load bearing member mounted on each side of the drawer, preferably toward the front of the drawer. Placing these load bearing members further apart and more toward the extremities of the drawer, with respect to horizontal axis H, and adjacent the front and rear walls, can provide from a more stable support structure for the articles contained within the drawer, especially during vehicular motion, but also during use of the drawer as it is extended out of the enclosure. Alternatively, where a greater path of horizontal and/or vertical travel is desired for the drawer, the first and second load bearing members can be positioned closer together.

Each load of these bearing members is, for example, formed from a core post 25 with a movable roller 26 rotatably mounted to post 25 and retained on post 25 by an end cap 27. More specifically, the post and be a metal pin or bolt, the roller formed as a plastic or low friction sleeve, and the end cap a threaded nut, rivet, embossment or the like.

Support structure 30 for drawer 20 includes three guides for the drawer to follow as it moves between open and closed positions. These guides function in pairs, handing off their function from one pair to the next, as the location of the drawer changes. More specifically, support structure 30 includes guides 32, 34, and 36. Guide 32 is, for example, formed as a slot in the support structure along each side of drawer 20. This slot receives and retains therein the first load bearing member 22. The end cap for that load bearing member is, for example, sufficiently enlarged to resist inadvertent removal of the load bearing member from the slot of guide 32. Slot 32 is formed to define the entire desired path of travel for drawer 20. In the drawings, slot 32 is shown, for example, to have a substantially horizontal section 32a, and inclined section 32b, and a substantially horizontal section 32c. The vertical drop along axis V of inclined section 32b can be used to define the extent of vertical drop of drawer 20, and can be established as needed in a given application, such as: according to the location of beams 64 above the top of door opening 68, the extent to which it is desirable to hide the existence of and/or contents of the drawer from view through the door opening, and/or the extent to which drawer 20 needs to avoid restricting clearance through the door opening for articles to be placed into the storage compartment, apart from those retained in the drawer.

Guide 34 is also formed, for example, as a slot in the support structure along each side of drawer 20. This slot receives and removably retains therein second load bearing member 24. Slot 34 is formed to define only a portion of the desired travel for drawer 20. Slot 34 has an opening 35 at the front of support structure 30 which allows the second load bearing member to exit and enter slot 34, as drawer 20 is fully opened and closed, respectively. Slot 34 has a means 50, preferably at one end thereof, for releasably securing drawer 20 in a closed position. For example, means 50 can be a vertical drop in the slot. As shown in the example of the drawings, this vertical drop has a slight rearward incline. However, alternative embodiments can a vertical drop with no rearward incline or even a slight forward incline. The vertical drop serves to block immediate sliding of load bearing member 24 along slot 34 toward opening 35. However, users can readily overcome that blockage by exerting a slight lifting force to the front of drawer 20 when it is desired to move the drawer. In the drawings, slot 34 is shown to have a short horizontal section 34a and an inclined section 34b.

The length of section 34a does not need to correspond with the length of section 32a. Where load bearing members 22 and 24 are each moving along substantially horizontal slot sections, drawer 20 is retained in a substantially horizontal orientation. However, where the length of section 34a is shorter than the length of section 32a, load bearing members 24 enter the inclined sections of slot 34 sooner than load bearing members 22 enter the inclined sections of slot 32. Thus, the front of drawer 20 can be tilted downward with respect to vertical axis V to an incline which makes the articles retained therein more accessible in the direction of door opening 68. Similarly, the slope of inclined sections 32b and 34b need not be identical either. In the drawings, for example, the slope of section 34b is somewhat greater than the slope of section 32b, thus maintaining the inclination or tilting of drawer 20 as load bearing member 22 first proceeds down inclined section 32b. The specific slopes used and the relative tilting of drawer 20 can be readily adapted using the present invention, according to the needs of a particular application for the drawer and the path it needs to take through the door opening.

Guide 36 is, for example, formed as a first, upper ledge or lip 37 on each side of drawer 20. Support structure 30 includes at least a single third load bearing member 38 mounted thereon, preferably toward the front side of that structure, and extending inwardly toward drawer 20. As drawer 20 is extended toward the fully open position and second load bearing member 24 leaves slot 34 through opening 35, third load bearing member 38 comes into contact with the underside of guide 36 and supports the drawer. Load bearing member 38 can also be formed, for example, from a core post with a rotatable sleeve mounted thereon so as to facilitate movement of drawer 20. Guide 36 also includes a second, lower ledge or lip 39, shown in the drawings, for example, as the upper ledge of C-channel 41, secured to the sides of drawer 20 by conventional fasteners, such as rivets R. Lower ledge 39 is spaced from upper ledge 37 by at least the width of third load bearing member 38, such that the third load bearing member can pass freely between those ledges. The C-channel is mounted toward the rear of drawer 20 and does not, in the example shown, extend the entire length of the sides of the drawer. This is in contrast with preferred embodiments where upper ledge 37 does extend along the entire side of the drawer. Thus, guide 36 has a first portion 40 where engagement of the third load bearing member with upper ledge 37 restricts downward movement of drawer 20, and a second portion 44 where engagement of the third load bearing member with lower ledge 39 also restricts upward movement of drawer 20.

Figure 5:
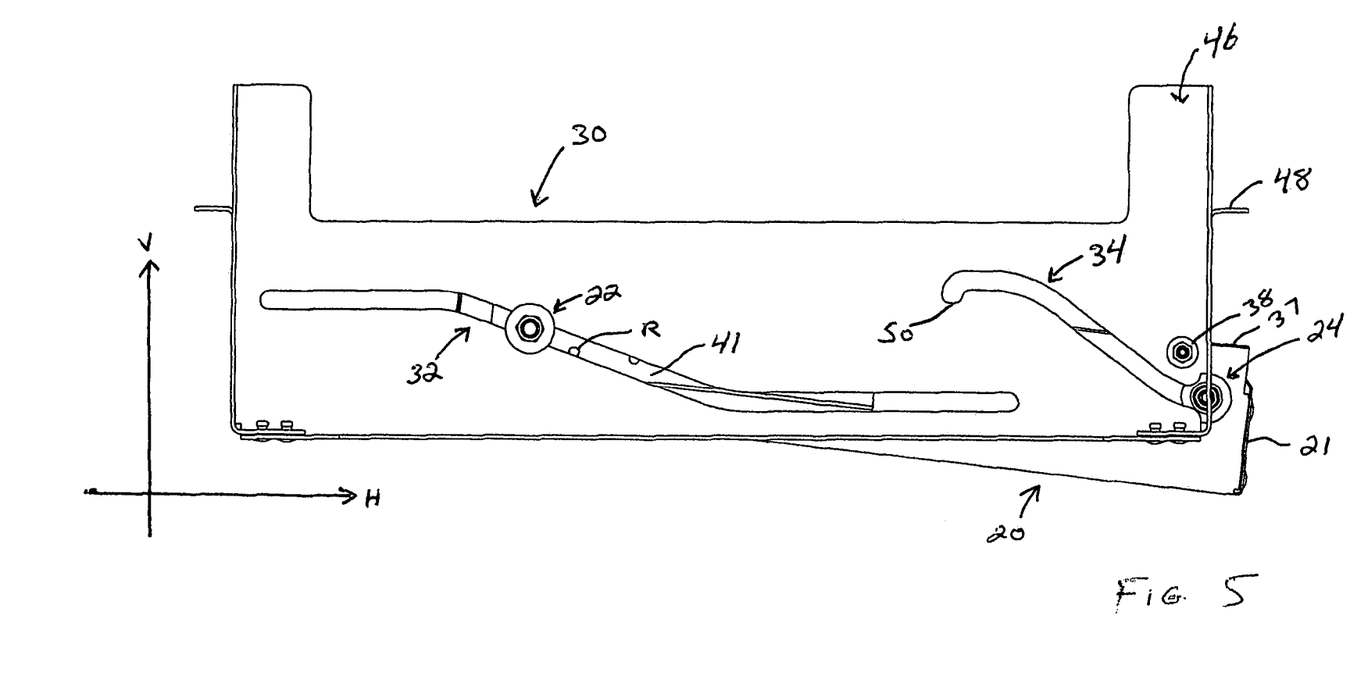
FIG. 5 is a left side view of the drawer arrangement of FIG. 1, in a partially opened position at an incline.
Figure 6:
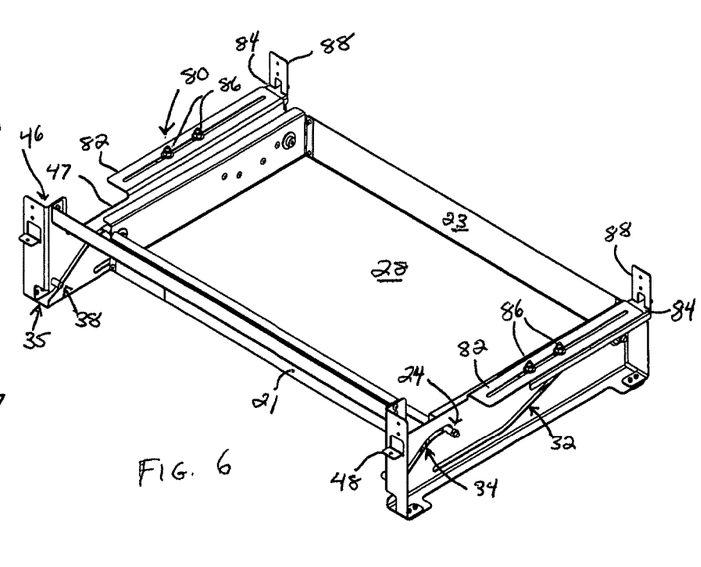
FIG. 6 is a front, right, upper perspective view of an alternative drawer arrangement according to the present invention, in a fully closed position, with the mounting tracks fully retracted.
Figure 7:
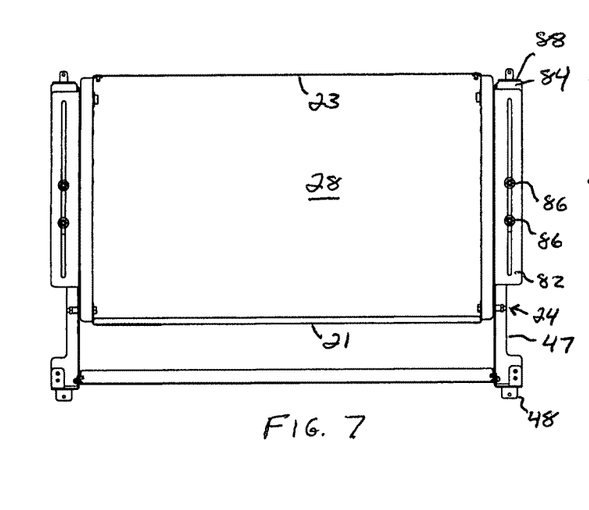
FIG. 7 is a top view of the drawer arrangement of FIG. 6.
Figure 8:
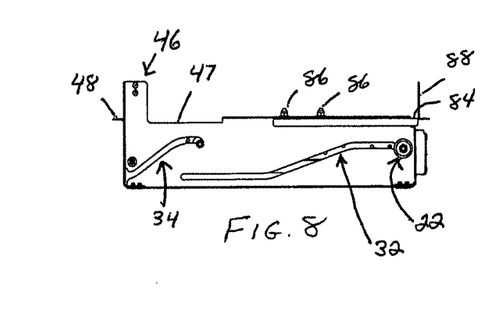
FIG. 8 is a right side view of the drawer arrangement of FIG. 6.
Figure 9:
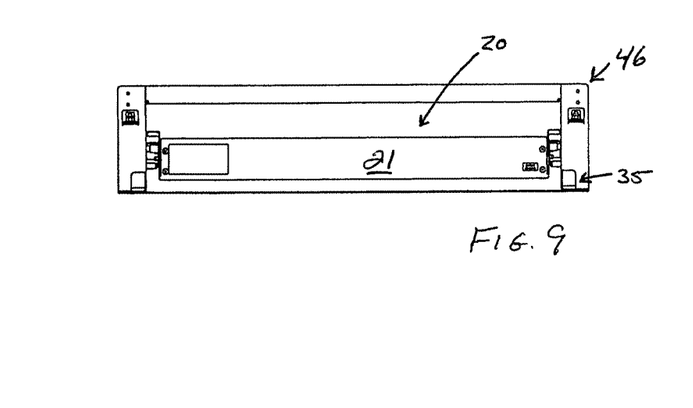
FIG. 9 is a front view of the drawer arrangement of FIG. 6.
Figures 10, 11, 12, 13:
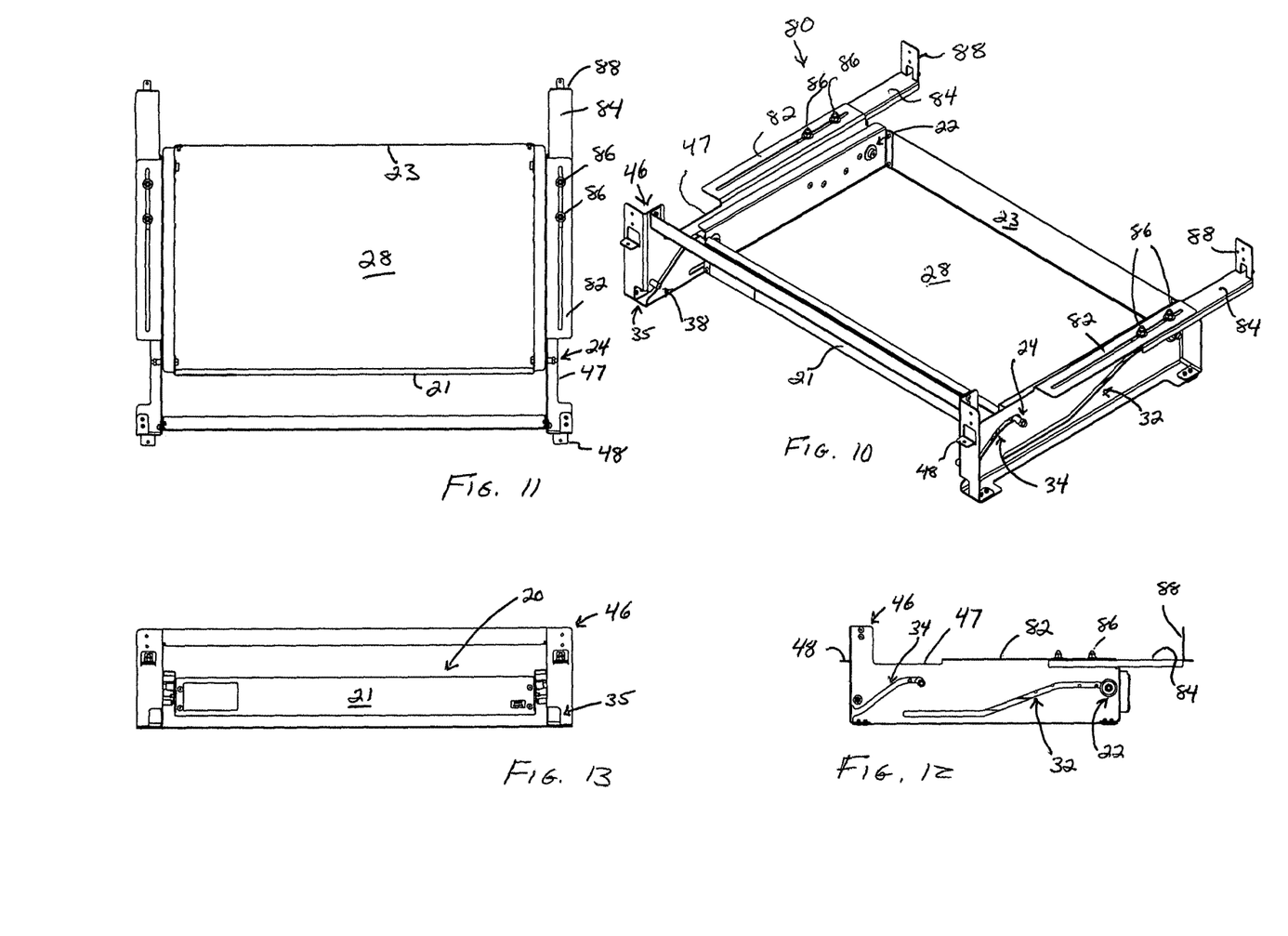
FIG. 10 is a front, right, upper perspective view of the drawer arrangement of FIG. 6 with the mounting tracks nearly fully extended.
FIG. 11 is a top view of the drawer arrangement of FIG. 10.
FIG. 12 is a right side view of the drawer arrangement of FIG. 10.
FIG. 13 is a front view of the drawer arrangement of FIG. 10.

In effect, support structure 30 uses guides 32 and 34 for the initial movement of drawer 20 from the fully closed position toward opened positions and for the initial inclined access of the drawer. As shown in FIG. 5, at the point when second load bearing member 24 leaves guide 34, third load bearing member 38 engages the underside of upper ledge 37. Thus, the first pair of guides 32 and 34 "handoff" support of drawer 20 to the second pair of guides 32 and 36. At that handoff, support for drawer 20 is then cantilevered with respect to support structure 30, since the drawer is only supported at or about its rear portion, and at another point intermediate its front and rear portions. As drawer 20 is fully extended to the open positions, in preferred embodiments the horizontal distance between the first and third load bearing members can shrink to 30% of the horizontal distance between the first and second load bearing members. This can allow substantial accessibility to the load surface of the drawer by the user, facilitating greater access to articles stored in the drawer and/or placement of articles to be stored in the drawer.

Support structure 30 is mounted to one or more beam 64 by corner flanges 46 which extend upward from sides 47 of the support structure. Placement tabs 48 can, for example, be formed in corner flanges 46 in order to facilitate that mounting and/or positive locating of the support structure with respect to the beams. In preferred embodiments, where support structure 30 utilizes the vertical space between the beams, the vertical distance between the top of sides 47 and the top of corner flanges 46 substantially corresponds to vertical thickness of the beams. Thus, corner flanges 46 extend upward toward the floor of the vehicle or the top surface of the enclosure, with the beam(s) being located between the corner flanges of each side, adjacent the top of sides 47.

FIGS. 6-13 illustrate an alternative embodiment of the present invention for use in applications where the support structure is desired to be secured to beams that are too far apart for use of the corner flanges of the specific support structure shown in FIGS. 1-5 and 14. In this alternative embodiment, support structure 30 is formed with a slide bracket or track 80 on each side. This slide track includes a ledge 82 formed at the top of each side 47, a bar or angled length 84 slidably mounted to ledge 83 by conventional fasteners 86, and a vertically extending mounting flange 88, secured to or formed at the rear end of bar 84. Mounting flange 88 is slidable from the retracted position shown in FIGS. 6-9 to an extended position shown in FIG. 10-13, according to the placement needed for the particular beam orientation of a given vehicle or enclosure structure. Once the desired extension of the mounting flange is selected, fasteners 86 are preferably tightened and the support structure is secured in place. Thus, the support structure is provided with a variable lateral connection width. Alternative embodiments which achieve a similar function can, for example, utilize telescopic, laterally extending tubes, rather than the slide track combination, or a kit form with a selection of precut extension brackets which are selectively connected to one or both sides of support structure 30 to effectively enlarge its horizontal dimension between the mounting flanges, as selected by the installer.

Although the present invention has been described above in connection with specific embodiments shown in the drawings, that is done by way of illustration and not as a limitation to the scope of the invention. For example, the embodiments of the drawings show the support structure formed for attachment to the underside of the top of the storage space enclosure, but support structure 30 can be readily adapted (in light of the teachings herein) for attachment to the upper surface of the bottom of the enclosure, such as where there is a significant vertical drop below the access door opening, and structural features of the vehicle are suitable for connection to the support structure of the drawer arrangement. Also, where the present invention is to be applied to a non-vehicular environment or where the vehicle does not employ support beams within the enclosure, the corner flanges of the support structure of the drawer arrangement can be formed to permit attachment to any suitable enclosure surface. In addition, in particular applications, the support structure of the drawer arrangement can be readily adapted to include multiple drawers of the type used in the present invention. Similarly, in applications where the vertical displacement of the drawer needs to be greater, the vertical dimension of the sides of support structure 30 can be increased to allow a greater vertical drop to slot sections 32b and 34b, for example. Further, the embodiments shown in the drawing are largely formed from stamped metal components, but in different applications these elements can be formed as molded or tubular assemblies, as the weight, aesthetic needs, and fabrication cost requirements may dictate or permit. Further still, a single set of movement stops 50 are illustrated in the drawings, but in a given application, additional movement stops can be employed, such as to releasably retain drawer 20 in a given inclined orientation intermediate full extension of the drawer from the vehicle. Still further, in FIG. 14 the drawer arrangement is illustrated as being mounted with respect to a beam 64 which extends laterally from side to side across the vehicle, but the same support structure can also be used to mount the present invention with respect to one or more beams extending longitudinally from front to back of the vehicle (in which case the lower surface of beam 64 could be disposed closer to the top of sides 47, and beam 64 would be intermediate corner flanges 46. Accordingly, the spirit and scope of the present invention are limited only by the terms of the following claims.

What is claimed is:

1. A drawer arrangement, comprising:
 a drawer including a first load bearing member and a second load bearing member, and
 a support structure for receiving and retaining the drawer and adapted to permit the drawer to move between open and closed positions, said support structure including a first guide that is formed as a slot for the drawer to follow as it moves between open and closed positions, said slot defining a path with vertical and horizontal changes therein, said first load bearing member riding in said first slot for travel along said path as said drawer opens and closes,
 a second guide within said support structure being a second slot that retains said second load bearing member within said second slot for a portion of the sliding travel of the drawer between open and closed positions;
 a third guide on said drawer for guiding motion of said drawer for at least a portion of the movement of the drawer between said open and closed positions, said support structure including a third load bearing member for engagement with said third guide for at least a portion of the movement of said drawer between said open and closed positions, said third guide including a first portion wherein engagement of said third load bearing member with said third guide prevents downward motion of said drawer with respect to said support structure and a second portion wherein engagement of said third load bearing member with said third guide prevents both downward movement of said drawer with respect to said support structure and restricts upward movement of said drawer with respect to said support structure.

2. The drawer arrangement of claim 1, wherein said load bearing members are formed from posts with moveable surfaces attached thereto.

3. The drawer arrangement according of claim 1 wherein the second load bearing member is not retained within the second slot when the third load bearing member is engaged with the second portion of the third guide.

4. The drawer arrangement of claim 1, wherein at least one of the first or second slots includes a means for releasably securing the drawer in a closed position.

* * * * *